United States Patent [19]

Inao et al.

[11] Patent Number: 5,292,494

[45] Date of Patent: Mar. 8, 1994

[54] PROCESS FOR PRODUCTION OF RED PHOSPHOROUS POWDER

[75] Inventors: Yoshikazu Inao; Yasuo Nojiri; Katsutoshi Shibata, all of Toyama, Japan

[73] Assignee: Rinkagaku Kogyo Company, Ltd., Toyama, Japan

[21] Appl. No.: 19,258

[22] Filed: Feb. 18, 1993

[30] Foreign Application Priority Data

Feb. 18, 1992 [JP] Japan .................................. 4-069002

[51] Int. Cl.$^5$ ...................... C01B 25/01; C01B 25/02; C01B 25/04
[52] U.S. Cl. ...................................... 423/322; 423/323
[58] Field of Search ................................. 423/322, 323

[56] References Cited

U.S. PATENT DOCUMENTS

| | | | |
|---|---|---|---|
| 2,397,951 | 4/1946 | De Witt | 23/223 |
| 2,476,335 | 7/1949 | Tusson | 423/322 |
| 4,152,403 | 5/1979 | McGilvery et al. | 423/322 |
| 4,188,367 | 2/1980 | McGilvery | 423/322 |
| 4,273,752 | 6/1981 | Lehr et al. | 423/322 |
| 4,526,766 | 7/1985 | Ryan et al. | 423/322 |
| 4,853,288 | 8/1989 | Staendeke et al. | 423/322 |
| 4,879,067 | 11/1989 | Sakon et al. | 423/322 |
| 4,985,221 | 1/1991 | Staendeke et al. | 423/322 |
| 5,026,757 | 6/1991 | Sakon et al. | 524/414 |
| 5,041,490 | 8/1991 | Sakon et al. | 524/414 |

FOREIGN PATENT DOCUMENTS 0249723 12/1987 European Pat. Off. .

OTHER PUBLICATIONS

Sol Skolnik et al., "Conversion of Liquid White Phosphorus to Red Phosphorus. II. Particle Size and Surface Area of Red Phosphorus as Functions of the Percentage Conversion", Department of Chemical Engineering, Tennessee Valley Authority, vol. 68, Nov. 1946, pp. 2310–2314.

Industrial and Engineering Chemistry, vol. 40, No. 2, 1948, pp. 357–366.

Primary Examiner—Gregory A. Heller
Attorney, Agent, or Firm—Sughrue, Mion, Zinn, Macpeak & Seas

[57] ABSTRACT

A process for the production of a red phosphorus powder, which comprises heating a yellow phosphorus at the boiling point therof in the presence of a dispersant selected from the group of a surfactant, a sparingly in water, finely powdered inorganic compound, an inorganic ammonium salt or an organic compound containing an amino group, thereby to partly convert the yellow phosphorus to red phosphorus, removing most of the unconverted yellow phosphorus by distillation at the boiling point of yellow phosphorus, and further removing the slight amount of the still remaining yellow phosphorus by heating a temperature not lower than the boiling point of yellow phosphorus to obtain a red phosphorus fine powder which is less apt to undergo a disproportionation reaction.

9 Claims, No Drawings

PROCESS FOR PRODUCTION OF RED PHOSPHOROUS POWDER

FIELD OF THE INVENTION

The present invention relates to a process for the production of a red phosphorus powder by the thermal conversion of yellow phosphorus.

BACKGROUND OF THE INVENTION

Production of red phosphorus by the thermal conversion reaction of yellow phosphorus is known. For example, a process in which yellow phosphorus is converted to red phosphorus by heating in a closed vessel is described in Kirk-Othmer "Encyclopedia of Chemical Technology" (2nd Ed.) Vol. 15, p. 286. In this process, after the reaction, the red phosphorus is chipped out under water, wet-ground, and sieved to give a red phosphorus powder.

In Industrial & Engineering Chemistry Vol. 40, P. 357 ('48), a continuous process is described. In this process, a slurry comprising a mixture of yellow phosphorus and red phosphorus is prepared by a thermal conversion reaction and the yellow phosphorus is separated from red phosphorus by evaporation in a screw conveyor type distilling device while the red phosphorus is powdered. Techniques related to this process are described in U.S. Pat. Nos. 2,476,335 and 2,397,951.

In U.S. Pat. No. 4,273,752 is described a process in which yellow phosphorus is introduced into a ball mill preheated at from 280° to 590° C. to convert the yellow phosphorus to red phosphorus and, after cooling, water is introduced into the ball mill to wet-grind the red phosphorus, which is then taken out as an aqueous suspension.

U.S. Pat. No. 4,526,766 discloses a process in which yellow phosphorus is converted to red phosphorus by the conversion heat thereof.

Red phosphorus is known as a flame retardant for synthetic resins. As is well known, red phosphorus decomposes by a disproportionation reaction in the presence of water to yield a substance which contaminates the environment or denatures synthetic resins. The decomposition reaction is accelerated at higher temperatures. Therefore, more stable and less reaction is needed especially for the resins molded at high temperatures. On the other hand, red phosphorus powder composed of fine particles is demanded in order to enhance compatibility with resins and dispersibility in resins. The prior-art techniques described above necessitate pulverizing of the red phosphorus by pulverizing process. However, since pulverizing forms split-off surfaces which are chemically unstable, water and other substances are apt to be adsorbed onto the surface of red phosphorus particles and the adsorbed substances accelerate the disproportionation reaction. The more finely the particles are reduced by pulverizing, the more the stability of the particles is impaired. Therefore, in the processes including pulverizing process, stability is incompatible with reduction into fine powder and it is impossible to obtain a stable red phosphorus fine powder.

In U.S. Pat. No. 4,879,067 (the same assignee of the present invention), red phosphorus in the form of spherical particles is described which has been obtained by a process including no pulverizing process. This red phosphorus composed of spherical particles is obtained by thermally converting yellow phosphorus at a temperature of from 250° to 600° C. in a conversion ratio not higher than 70%, and is highly stable because no pulverizing was used. However, in this process, the smaller the particles, the more the particle size control becomes difficult. The above process is hence unsuited for the production of fine powders of red phosphorus.

SUMMARY OF THE INVENTION

The present invention provides a process for production of a red phosphorus powder by the thermal conversion of yellow phosphorus, which comprises heating the yellow phosphorus at the boiling point thereof in the presence of a dispersant thereby to partly convert the yellow phosphorus to red phosphorus and removing the unconverted yellow phosphorus by evaporation. The red phosphorus powder obtained by the process of the present invention is useful as a flame retardant for synthetic resins, especially for engineering resins.

DETAILED DESCRIPTION OF THE INVENTION

The process of the present invention for production of a red phosphorus powder is characterized in that yellow phosphorus is thermally converted to red phosphorus in the presence of a dispersant and the process does not necessitate any pulverizing step. A red phosphorus powder obtained by this process is stable to disproportionation reaction and composed of particles having a desired and controlled size. Thus, according to such process of the present invention, a stable red phosphorus fine powder in which an average particle size is 10 μm or less and 80% by weight or more of the particles are a particle size of 20 μm or less can be produced in good yield.

The dispersant in the present invention may be selected from the group of a surfactant, a sparingly soluble in water, finely powdered inorganic compound, an inorganic ammonium salt, or an organic compound containing an amino group. It can be presumed that when yellow phosphorus is heat-melted in the presence of a dispersant to convert the yellow phosphorus to red phosphorus at a temperature near the boiling point of yellow phosphorus, the dispersant enhances the dispersibility of red phosphorus fine particles that are being formed in the molten yellow phosphorus and controls an agglomeration of particles, thereby prevents from the formation of the larger particles. Therefore, besides the dispersants enumerated above, any substance which acts likewise may be used as the dispersant in the present invention.

In the present invention, due to the action of such a dispersant, red phosphorus in the form of a powder can be obtained without pulverizing process and the particle sizes of the red phosphorus powder obtained can be arbitrarily controlled by selecting reaction conditions. It is also possible to easily obtain a red phosphorus fine powder having an average particle size of from several to 10-odd micrometers.

As the surfactant that can be used as the dispersant in the present invention, any kinds of surfactants may be employed such as, for example, an anionic surfactant, a cationic surfactant, an amphoteric surfactant, a nonionic surfactant, or a high-molecular surfactant.

Specific examples of the anionic surfactant include carboxylate surfactants, sulfonate surfactants, sulfate ester surfactants, and phosphate ester surfactants.

Specific examples of the cationic surfactant include inorganic or organic salts of aliphatic amines, quaternary ammonium salts, benzalkonium salts, and imidazolinium salts. Specific examples of the amphoteric surfactant include aminocarboxylate surfactants and betaine surfactants. Specific examples of the nonionic surfactant include ether surfactants, ester surfactants, ether-ester surfactants, and nitrogen-containing surfactants.

Further, representative examples of the high-molecular surfactant include polycarboxylate surfactants and naphthalenesulfonic acid-formalin condensates.

Useful examples of the sparingly soluble in water, finely powdered inorganic compound that can be used as the dispersant in the present invention include metal oxides such as silica, aluminum oxide, titanium oxide, zinc oxide, and magnesium oxide, sparingly soluble salts such as calcium carbonate, aluminum silicate, barium sulfate, calcium sulfate, calcium phosphate, and apatite, and inorganic polymers such as talc, bentonite, kaolin, diatomaceous earth, and clay. It is preferred that the average particle size of these sparingly soluble in water, finely powdered inorganic compounds is 1 μm or less.

Examples of the inorganic ammonium salt that can be used as the dispersant in the present invention include ammonium sulfate and ammonium chloride. Such inorganic ammonium salts also effectively act as the dispersant in the present invention and, hence, these also are preferred examples of the dispersant.

Examples of the organic compound containing an amino group that can be used as the dispersant in the present invention include primary, secondary, or tertiary amines, amine salts, quaternary ammonium salts, and derivatives thereof; and amide compounds, e.g., carboxamides, amides of sulfuric esters, and amides of phosphoric esters, and derivatives thereof.

It is preferred that such an organic compound containing an amino group has a boiling point higher than 100° C. and is liquid in molten yellow phosphorus.

In the present invention, the dispersant is added as it is or after being dissolved or dispersed in water or in an organic solvent. The amount of the dispersant to be added is preferably in the range of from 0.01 to 5% by weight based on the amount of the yellow phosphorus. In most cases, the dispersant is sufficiently effective in an amount as small as 1% by weight or less.

The average particle size of the red phosphorus powder to be obtained by the present invention varies depending on the kind and amount of the dispersant employed and on conversion ratio. The conversion ratio can be controlled by the reaction time; the longer the reaction time, the more the conversion ratio increases. There is a tendency that larger dispersant amounts result in smaller average particle sizes, while longer reaction times result in higher conversion ratios and larger average particle sizes. However, if no dispersant is added, agglomeration of particles begins rapidly after the initiation of the conversion reaction, so that it is practically impossible to obtain such a red phosphorus powder as those having an average particle size of 10 μm or less. In contrast, according to the process of the present invention, even a red phosphorus fine powder of several micrometers can be produced easily.

In the case of adding no dispersant, the red phosphorus particles not only are large, but also have a wide particle size distribution. In contrast, the red phosphorus according to the present invention is composed of red phosphorus fine particles and has been controlled to have a narrow particle size distribution. For example, 80% or more of a red phosphorus fine powder having an average particle size of 10 μm or less is composed of fine particles having particle sizes of 20 μm or less.

Table 1 shows an exemplary conversion ratio and average particle size in the case of adding no dispersant and in the case of adding a dispersant, while Table 2 shows an exemplary particle size distribution in each of the two cases.

TABLE 1

| Red Phosphorus | Conversion Ratio (%) | Average Particle Size (μm) |
|---|---|---|
| Addition of no dispersant | 34.5 | 43.9 |
| Addition of dispersant[1] | 32.3 | 5.2 |

[1]Addition of 0.5% sodium methyltaurate.

TABLE 2

| Particle size (μm) | Addition of no dispersant[1] Average particle size 43.9 μm (%) | Addition of dispersant | |
|---|---|---|---|
| | | Average particle size 9.6 μm[3] (%) | Average particle size 5.2 μm[2] (%) |
| 8 or less | 0.9 | 37.1 | 76.3 |
| 20 or less | 3.3 | 94.5 | 96.9 |
| 32 or less | 24.2 | 99.2 | 99.9 |
| 44 or less | 50.9 | 100.0 | 100.0 |
| 56 or less | 68.0 | | |
| 68 or less | 78.1 | | |
| 80 or less | 83.5 | | |
| 92 or less | 89.5 | | |
| 128 or less | 100.0 | | |

[1], [2]The same as in Table 1.
[3]Addition of 0.5% oleamide; conversion ratio 31.7%.
The average particle sizes were measured with a granulometer model 715 (manufactured by CILAS ALCATEL, France).

According to the present invention, a red phosphorus powder having any desired average particle size can be obtained in a conversion ratio as high as from 30 to 80%, by suitably selecting the kind of dispersant, dispersant amount and coversion conditions.

Table 3 shows data on dispersant amount, conversion time, conversion ratio, and average particle size of red phosphorus in the case of using a polyoxyethylene fatty acid ester (Ethofat 0/15, manufactured by Lion Corp., Japan).

TABLE 3

| Dispersant amount (w/w%) | Conversion time (Hr) | Conversion ratio (%) | Average particle size (μm) |
|---|---|---|---|
| 0.47 | 4 | 19.8 | 12.6 |
| 0.60 | 8 | 30.0 | 15.0 |
| 0.80 | 8 | 33.0 | 6.9 |
| 0.97 | 4 | 15.8 | 4.2 |
| 1.00 | 8 | 33.8 | 7.5 |
| 3.50 | 12 | 70.6 | 15.0 |

From observation of a red phosphorus fine powder according to the present invention with an electron microscope, it was ascertained that the powder consisted of spherical single particles and of agglomerate particles composed of some spherical particles.

This fact clearly indicates that agglomeration of particles has been effectively controlled in the red phosphorus fine powder obtained by the process of the present invention.

Furthermore, it was also ascertained from the results of a stability measurement that red phosphorus fine powders of the present invention, composed of spherical particles, show extremely high stability as compared with conventional pulverized red phosphorus powders and are very useful as a flame retardant for high-performance engineering resins.

Table 4 shows results of a measurement in which the stability of red phosphorus powders of the present invention and pulverized red phosphorus powders was examined in terms of the amount of phosphine generated.

TABLE 4

| Red Phosphorus | Average particle size (μm) | Amount of phosphine generated (μg/g) |
|---|---|---|
| Red Phosphorus powder (1) | 4.8 | 36.6 |
| Red Phosphorus powder (2) | 9.6 | 35.3 |
| Pulverized red phosphorus powder | 5.0 | 1615.0 |
| Pulverized red phosphorus powder | 20.0 | 945.0 |

(1): Addition of 0.5% 4,4'-diaminodiphenylmethane.
(2): Addition of 0.5% oleamide.

The amount of phosphine generated was measured as follows. 10 g of red phosphorus is placed in a 200-ml Erlenmeyer flask, which is then sealed by a stopper having two gas-passing tubes. One of the gas-passing tubes is connected to an $N_2$ gas container, while the other to a gas collector vessel. $N_2$ gas is then introduced to sufficiently replace the inside of the Erlenmeyer flask with the gas. This Erlenmeyer flask is immersed in a 190° C. oil bath and maintained at this temperature for 3 hours, and any gas that is evolved during this time period is collected. The phosphine content in the collected gas is measured with a phosphine detector.

DESCRIPTION OF PREFERRED EMBODIMENTS

Preferred embodiments of the process of the present invention for producing a red phosphorus powder are described below.

As a reaction vessel, a vessel having a lid is used. This vessel is provided with a thermometer, condenser, and stirrer. The lid of the reaction vessel is provided with a detachable heat insulator.

Into the reaction vessel is introduced a proper amount of warm water. (The "warm water" means water having a temperature at which yellow phosphorus can be kept in its molten state; hereinafter every "warm water" has the same meaning.) Subsequently, measured amounts of molten yellow phosphorus and a dispersant are placed in the vessel.

On the other hand, the condenser is connected to a receiver vessel filled with warm water, so that the tip of the condenser is immersed in the warm water. Further, the heat insulator is fitted to the lid of the reaction vessel and warm water is passed through the condenser. Thereafter, this reaction vessel is heated by external heating while $N_2$ gas is flowing into the apparatus.

After all of the water in the reaction vessel has been removed by distillation, the heat insulator on the lid is detached and the reaction vessel is further heated to the conversion temperature. The temperature in the reaction vessel is maintained at about 280° C. which is the boiling point of yellow phosphorus, and the conversion reaction is allowed to proceed while evaporated yellow phosphorus is refluxing within this reaction vessel.

When desired reaction time has elapsed, the lid is heat-insulated again and the unconverted yellow phosphorus is distilled off. The liquid yellow phosphorus condensed in the condenser is recovered in the receiver vessel containing the warm water.

After almost all of the yellow phosphorus has been distilled off, the reaction vessel is further heated so that the reaction product is heated to a temperature between 280° C. and 330° C., thereby to remove the yellow phosphorus remaining in the red phosphorus in a slight amount.

After the reaction vessel is then allowed to cool, the red phosphorus in a powder form is taken out of the reaction vessel.

The yellow phosphorus recovered from the receiver vessel is recycled as raw material yellow phosphorus.

To further illustrate the present invention in greater detail, the following non-limiting Examples are provided.

EXAMPLE 1

Into a reaction vessel made of iron (155 mm (inside diameter) × 130 mm (height)) was introduced 1 liter of warm water having a temperature of about 60° C., followed by 990 g of molten yellow phosphorus and 19 g of a sodium methyltaurate surfactant (Lipotack TE-P, manufactured by Lion Corp., Japan; sodium methyltaurate content 26%) as a dispersant.

This reaction vessel was covered with a lid and a glass-wool heat insulator covering was fitted to the lid. The reaction vessel was then set on an electric heater.

Subsequently, $N_2$ gas was passed through the reaction vessel at a rate of 1.0 NL/min and warm water of about 60° C. was allowed to flow through the jacket of the condenser.

The heater was switched on to heat the reaction vessel, thereby to distill off the water first. The water removal by distillation was completed at the temperature around 100° C. Then, the heat insulator covering on the lid was detached and heating was continued further for rising the temperature.

After the temperature had reached about 280° C., heating was continued further for about 8 hours while the heater was kept being controlled so that the reaction mixture was maintained at that temperature and the yellow phosphorus was refluxed within the reaction vessel.

Thereafter, the heat insulator covering was fitted again and $N_2$ gas was introduced at an increased rate of 4.0 NL/min, thereby to distill the unconverted yellow phosphorus. After almost all of the yellow phosphorus had been distilled off, the residue was heated to more than 280° C. and heating was continued at a temperature not higher than 330° C. for about 4 hours, thereby the slight amount of the yellow phosphorus remaining in the residue was removed.

After cooling, 320 g of red phosphorus of fine particles was obtained. This red phosphorus fine powder had an average particle size (mean volume diameter) of 5.2 μm. The conversion ratio was 32.3%.

EXAMPLE 2

The same procedures as in Example 1 were proceeded except that 0.3% of a polyoxyethylene quaternary ammonium chloride (Ethoquat 0/12, manufactured by Lion Corp., Japan) was used as a dispersant in place of Lipotack TE-P. A red phosphorus powder having an average particle size of 3.2 μm was obtained in a conversion ratio of 33.0%.

EXAMPLE 3

The same procedures as in Example 1 were proceeded except that 0.8% of a polyoxyethylene fatty acid ester (Ethofat 0/15, manufactured by Lion Corp., Japan) was used as a dispersant in place of Lipotack TE-P. A red phosphorus powder having an average particle size of 6.9 μm was obtained in a conversion ratio of 33.0%.

EXAMPLE 4

The same procedures as in Example 1 were proceeded except that 1% of ammonium chloride was added as a dispersant in place of Lipotack TE-P. A red phosphorus powder having an average particle size of 22.4 μm was obtained in a conversion ratio of 35.8%.

EXAMPLE 5

The same procedures as in Example 1 were proceeded except that 1.0% of an aluminum oxide powder (average particle size 0.02 μm; manufactured by Nippon Aerosil Co., Ltd., Japan) was added as a dispersant in place of Lipotack TE-P. A red phosphorus powder having an average particle size of 12.6 μm was obtained in a conversion ratio of 36.5%.

EXAMPLE 6

The same procedures as in Example 1 were proceeded except that 0.5% of 4,4'-diaminodiphenylmethane was added as a dispersant in place of Lipotack TE-P. A red phosphorus powder having an average particle size of 4.8 μm was obtained in a conversion ratio of 30.3%.

EXAMPLE 7

The same procedures as in Example 1 were proceeded except that 0.5% of oleamide was added as a dispersant in place of Lipotack TE-P. A red phosphorus powder having an average particle size of 9.6 μm was obtained in a conversion ratio of 31.7%

The present invention provides a process for production of a red phosphorus powder by the thermal conversion of yellow phosphorus in the presence of a dispersant. According to the present invention, a red phosphorus fine powder such as those having particle sizes of from several micrometers to 10-odd micrometers can be produced without the necessity of pulverizing step, and the average particle size can be arbitrarily controlled by selecting reaction conditions. Since the red phosphorus fine powder obtained by the process of the present invention is less apt to suffer decomposition or denaturation attributable to a disproportionation reaction and is highly stable, it is useful especially as a flame retardant for high-performance resins.

While the invention has been described in detail and with reference to specific embodiments thereof, it will be apparent to one skilled in the art that various changes and modifications can be made therein without departing from the spirit and scope thereof.

What is claimed is:

1. A process for the production of a red phosphorus powder by the thermal conversion of yellow phosphorus, which comprises heating the yellow phosphorus with refluxing at the boiling point thereof in the presence of a dispersant thereby to convert the yellow phosphorus to red phosphorus until a desired conversion ratio, removing most of the unconverted yellow phosphorus by distillation at the boiling point of yellow phosphorus, and then heating the residue to a temperature not lower than the boiling point of yellow phosphorus thereby to remove the unconverted yellow phosphorus still remaining;

wherein the dispersant is a member selected from the group consisting of a surfactant, a sparingly soluble in water, finely powdered inorganic compound having an average particle size of 1 μm or less, an inorganic ammonium salt, and an organic compound containing an amino group;

and wherein the thermal conversion reaction proceeds in the presence of from 0.01 to 5% by weight of the dispersant based on the amount of the yellow phosphorus.

2. A process as claimed in claim 1, wherein the dispersant is a surfactant.

3. A process as claimed in claim 1, wherein the dispersant is a sparingly soluble in water, finely powdered inorganic compound having an average particle size of 1 μm or less.

4. A process as claimed in claim 1, wherein the dispersant is an inorganic ammonium salt or an organic compound containing an amino group.

5. A red phosphorus fine powder obtained by a process which comprises heating yellow phosphorus at the boiling point thereof in the presence of a dispersant thereby to partly convert the yellow phosphorus to red phosphorus and removing the unconverted yellow phosphorus by evaporation, said red phosphorus powder comprises of spherical particles and/or aggregates of said spherical particles which have an average particle size of 10 μm or less and 80% by weight or more of which have a particle size of 20 μm or less and being less apt to undergo a disproportionation reaction;

wherein the dispersant is a member selected from the group consisting of a surfactant, a sparingly soluble in water, finely powdered inorganic compound having an average particle size of 1 μm or less, an inorganic ammonium salt, and an organic compound containing an amino group;

and wherein the thermal conversion reaction proceeds in the presence of from 0.01 to 5% by weight of the dispersant based on the amount of the yellow phosphorus.

6. A red phosphorus powder as claimed in claim 5, wherein the dispersant is a surfactant.

7. A red phosphorus powder as claimed in claim 5, wherein the dispersant is an organic compound containing an amino group.

8. A red phosphorus powder as claimed in claim 5, wherein the dispersant is an inorganic ammonium salt.

9. A red phosphorus powder as claimed in claim 3, wherein the dispersant is a sparingly soluble in water, finely powdered inorganic compound having an average particle size of 1 μm or less.

* * * * *